(12) United States Patent
Andersson Aginger et al.

(10) Patent No.: US 9,840,951 B2
(45) Date of Patent: Dec. 12, 2017

(54) APPARATUS FOR THE CLEANING OF CRANKCASE GAS

(71) Applicant: ALFA LAVAL CORPORATE AB, Lund (SE)

(72) Inventors: Thomas Andersson Aginger, Skärkolmen (SE); Lars-Göran Nylen, Nykvarn (SE)

(73) Assignee: ALFA LAVAL CORPORATE AB, Lund (SE)

( * ) Notice: Subject to any disclaimer, the term of this patent is extended or adjusted under 35 U.S.C. 154(b) by 134 days.

(21) Appl. No.: 14/385,429

(22) PCT Filed: Mar. 11, 2013

(86) PCT No.: PCT/EP2013/054880
§ 371 (c)(1),
(2) Date: Sep. 15, 2014

(87) PCT Pub. No.: WO2013/135630
PCT Pub. Date: Sep. 19, 2013

(65) Prior Publication Data
US 2015/0068172 A1      Mar. 12, 2015

(30) Foreign Application Priority Data

Mar. 13, 2012   (EP) .................................... 12159278

(51) Int. Cl.
*B01D 46/18* (2006.01)
*F01M 13/04* (2006.01)
(Continued)

(52) U.S. Cl.
CPC ............ *F01M 13/04* (2013.01); *B01D 45/14* (2013.01); *B04B 5/005* (2013.01); *B04B 5/12* (2013.01);
(Continued)

(58) Field of Classification Search
CPC ............ F01M 13/04; F01M 2013/0422; B04B 5/005; B04B 9/06; B04B 2005/125; B04B 5/12; B01D 45/14
See application file for complete search history.

(56) References Cited

U.S. PATENT DOCUMENTS

| 580,099 A | 4/1897 | Williams |
| 976,174 A | 11/1910 | Henry, Jr. |

(Continued)

FOREIGN PATENT DOCUMENTS

| RU | 2325952 C2 | 6/2008 |
| SU | 1346828 A1 | 10/1987 |
| WO | WO 2004/022239 A1 | 3/2004 |

OTHER PUBLICATIONS

Vishal Gupta et al, "Effect of Jet Length on the Performance of Pelton Turbine: Distance Between Nozzle Exit and Runner", vol. 11, No. 19, Oct. 2016, pp. 11487-11494.

*Primary Examiner* — Dung H Bui
(74) *Attorney, Agent, or Firm* — Birch, Stewart, Kolasch & Birch, LLP

(57) ABSTRACT

An apparatus for the cleaning of crankcase gas from an internal combustion engine includes a housing and a separation chamber for the crankcase gas with a centrifugal rotor arranged for the cleaning of the crankcase gas in the separation chamber. The centrifugal rotor includes a drive shaft extending into a drive chamber of the apparatus. A turbine is connected to the drive shaft. A nozzle is arranged to receive pressurized liquid from the combustion engine and to direct the pressurized liquid in a jet from a nozzle opening against the turbine for rotation of the centrifugal rotor. An adapter element is configured such that the apparatus is mountable onto the combustion engine with a drive liquid passage in communication with the nozzle. The nozzle is integrally formed with the adapter element with a nozzle (Continued)

passage having a conical shape which converges in the flow direction towards the nozzle opening.

16 Claims, 2 Drawing Sheets

(51) Int. Cl.
- *B01D 45/14* (2006.01)
- *B04B 5/00* (2006.01)
- *B04B 9/06* (2006.01)
- *B04B 5/12* (2006.01)

(52) U.S. Cl.
CPC .......... *B04B 9/06* (2013.01); *B04B 2005/125* (2013.01); *F01M 2013/0422* (2013.01)

(56) References Cited

U.S. PATENT DOCUMENTS

| | | | |
|---|---|---|---|
| 4,295,788 A * | 10/1981 | Dussourd | F01D 1/34 415/202 |
| 4,355,949 A | 10/1982 | Bailey | |
| 6,017,300 A * | 1/2000 | Herman | B04B 1/08 210/167.02 |
| 6,019,717 A * | 2/2000 | Herman | B04B 1/08 210/167.02 |
| 6,210,311 B1 * | 4/2001 | May | B04B 5/005 494/24 |
| 6,213,929 B1 | 4/2001 | May | |
| 6,925,993 B1 | 8/2005 | Eliasson et al. | |
| 7,011,690 B2 | 3/2006 | Altvater et al. | |
| 7,052,529 B2 | 5/2006 | Franzen et al. | |
| 2002/0049126 A1 * | 4/2002 | Herman | B04B 1/04 494/75 |
| 2002/0128140 A1 * | 9/2002 | Frehland | B04B 5/005 494/49 |
| 2003/0221558 A1 | 12/2003 | Lister et al. | |
| 2004/0025482 A1 * | 2/2004 | Borgstrom | B04B 5/005 55/438 |
| 2004/0107681 A1 * | 6/2004 | Carlsson | B01D 45/14 55/406 |
| 2004/0159085 A1 | 8/2004 | Carlsson et al. | |
| 2007/0163444 A1 * | 7/2007 | Eliasson | B01D 45/14 96/281 |
| 2011/0030629 A1 | 2/2011 | Schleiden | |
| 2011/0180051 A1 * | 7/2011 | Schwandt | F01M 13/04 123/573 |
| 2014/0018227 A1 * | 1/2014 | Andersson Aginger | B04B 5/005 494/43 |

\* cited by examiner

APPARATUS FOR THE CLEANING OF CRANKCASE GAS

FIELD OF THE INVENTION

The present invention relates to an apparatus for the cleaning of crankcase gas from an internal combustion engine, the apparatus comprising a centrifugal rotor which is arranged to rotate about a rotational axis and adapted for the cleaning of the crankcase gas in a separation chamber, the centrifugal rotor comprising a drive shaft extending into a drive chamber of the apparatus, wherein a turbine is connected to the drive shaft and a nozzle is arranged to receive pressurized liquid from the combustion engine and to direct the pressurized liquid in a jet from a nozzle opening against the turbine for rotation of the centrifugal rotor, the apparatus being configured with an adapter element such that the apparatus is mountable onto the combustion engine, the adapter element comprising an abutment surface which is arranged to abut against a corresponding abutment surface on the combustion engine, the abutment surface of the adapter element having a drive liquid opening that is arranged to receive the pressurized liquid from a supply opening in the abutment surface of the combustion engine, and the adapter element comprising a drive liquid passage connecting the drive liquid opening with the nozzle.

BACKGROUND OF THE INVENTION

An apparatus of this kind is known from U.S. Pat. No. 6,925,993 B1. The centrifugal rotor of the apparatus is driven by pressurized lubricating oil from the combustion engine, wherein the nozzle is arranged to direct the jet of pressurized oil onto the turbine wheel for rotation of the centrifugal rotor. A section through the adapter element is shown (see FIGS. 2 and 3 of U.S. Pat. No. 6,925,993) with the nozzle being situated in a drive oil passage of the adapter element. The nozzle is manufactured by machining a piece of brass material into the shown shape having a trumpet-shaped nozzle passage which converges in the flow direction towards the nozzle opening, after which the machined nozzle is inserted into the drive oil passage of the adapter element.

There is a general desire to improve the separating efficiency of the apparatus, and one way of achieving this is to increase the rotational speed of the centrifugal rotor. This may for instance be done by increasing the size of the nozzle opening to discharge a greater amount of pressurized liquid against the turbine. However, increasing the flow rate in this way will also increase the power take off from the combustion engine used for driving the centrifugal rotor. A road vehicle is equipped with various auxiliary equipment designed to be driven by the combustion engine, and it would therefore be beneficial to limit the power take off by the auxiliary equipment (e.g. for good fuel economy). To increase the efficiency of the drive for the centrifugal rotor in order to achieve as high centrifugal rotor speeds as possible with limited power consumption is thereby desirable. A further important aspect in designing the apparatus is that of providing a simple solution (promoting cost-efficient manufacturing and assembly of the apparatus) with high performance. The adapter element for supplying pressurized liquid to drive the centrifugal rotor is one way of achieving this, yet to further improve this aspect is still very much desirable.

SUMMARY OF THE INVENTION

An object of the invention is to provide an apparatus having high performance and which can be produced in a cost-efficient way. In particular the object is to provide an adapter element having increased efficiency in driving the centrifugal rotor, and which simplifies the manufacturing and assembly of the apparatus.

This object is achieved by the apparatus according to the present invention. Thus, according to the invention the initially defined apparatus is characterized in that the nozzle is integrally formed with the adapter element with a nozzle passage having a conical shape which converges in the flow direction towards the nozzle opening.

The invention provides a more efficient conversion between pressure and kinetic energy. The speed on the liquid jet leaving the nozzle will depend on the shape of the nozzle passage and the operating pressure on the liquid. The conical nozzle passage is a good compromise between keeping the nozzle passage short to reduce friction losses, yet having a smooth reduction adapted to increase the speed of the liquid. A higher jet speed is achieved as a result of the conical nozzle passage compared to the trumpet-shaped nozzle passage. At liquid pressures of for instance 2-5 bars the conical nozzle passage may thereby give an additional 100-300 rpm at centrifugal rotor speeds in the range of 3000-10000 rpm. Consequently, the nozzle of the invention is more efficient in converting pressurized energy into kinetic energy, and the performance of the drive is therefore improved.

The invention furthermore simplifies the assembly of the apparatus by integrating the nozzle in one piece with the adapter element. Accordingly, it's not necessary to insert a separate nozzle into the drive oil passage of the adapter element as in the previously known apparatus. The mounting of the previous nozzle will typically also include a quality check to control that it has been inserted correctly, e.g. that the outside of the nozzle provides a seal against the drive oil passage, so that pressurized oil doesn't leak between the nozzle periphery and the drive oil passage. This is no longer necessary, so the adapter element with integrated nozzle is also more reliable in this way.

Furthermore, it is relatively easy to manufacture the conical shape of the nozzle passage (i.e. straight profile) compared to the previously known trumpet shape (i.e. curved profile). The adapter element may for instance be manufactured in a single piece of aluminum, in which the conical nozzle passage is machined by using a drill of conical shape. It would be significantly more difficult and costly to machine an integrated nozzle having a trumpet shape, or any other curved shape for that matter (such as a de Laval nozzle). The nozzle passage should preferably have a straight profile along its entire length, but it doesn't necessarily have to be conical. It may for instance include a portion having a cylindrical shape.

The improved performance may with advantage be used to promote the separating efficiency of the apparatus by driving the turbine and the centrifugal rotor at higher speeds with maintained power consumption. An alternative would be to reduce the size of the nozzle opening and thereby save energy in driving the centrifugal rotor at the lower speeds. The nozzle opening may hereby be dimensioned in view of a given operating pressure range on the liquid (giving a jet speed range) and the crankcase gas flow rates of the combustion engine (giving different loads on the centrifugal rotor) in order to drive the centrifugal rotor within an operating range which achieves a desired separating efficiency. The size of the nozzle opening can in this way be adapted to achieve a desired compromise between separating efficiency and energy consumption.

According to an embodiment of the invention the conical shape of the nozzle passage converges along at least a major longitudinal portion of the nozzle passage. A major longitudinal portion means at least 50%, but preferably it is more than 80%, of the entire length of the nozzle passage. The conical shape of the nozzle passage may also converge along the entire length of the nozzle passage up to the nozzle opening. In this way the performance is further improved. As can be seen in FIG. 1 the previously known trumpet-shaped nozzle passage comprises a major portion having an essentially cylindrical shape before the jet leaves the nozzle opening. However, it's more efficient to converge continuously towards the nozzle opening (meaning less frictional losses in the nozzle passage) than to have a quick reduction giving a high speed flow with higher frictional losses in a relatively long cylindrical portion. The conical shape of the nozzle passage is thereby configured to converge along a major longitudinal portion, or along the entire length, of the nozzle passage, in such a manner that the liquid is gradually accelerated throughout at least the major longitudinal portion of the nozzle passage.

According to another embodiment of the invention the nozzle passage comprises a minor longitudinal portion having a cylindrical shape at the nozzle opening, wherein the minor longitudinal portion is several times shorter than the major longitudinal portion having the conical shape. A minor cylindrical portion at the nozzle opening may thereby provide a safety margin when the conical portion of the nozzle passage is formed. The conical nozzle passage may for instance be machined by using a drill of conical shape, wherein the conical nozzle passage is drilled up close to the nozzle opening. Drilling is stopped a short distance (e.g. 0.1-1.0 mm) from the nozzle opening—leaving the minor cylindrical portion—to avoid the risk of drilling into the nozzle opening in such a way as to unintentionally increase its size. If for instance the diameter of the nozzle opening is dimensioned in the range of 2-3 mm, even fractions of a millimeter off in a manufacturing fault can give a significantly different operation of the centrifugal rotor which is far from a desired one.

According to a further embodiment of the invention the conical shape of the nozzle passage converges to form an angle in the range of 5°-9° to a center line of the nozzle passage. Or in other words, the conical shape is formed to converge in an angle in the range of 10° to 18° as measured between opposing walls of the nozzle passage. In this range the conical shape may preferably form an angle of 7° to the center line of the nozzle passage.

According to yet another embodiment of the invention the drive liquid passage is also configured with a longitudinal portion having a conical shape for converging pressurized liquid into the nozzle passage. In this way the drive liquid passage will, in same manner as the nozzle passage, provide a smooth reduction adapted to gradually increase the speed of the liquid. The aim is to avoid abrupt changes in the cross-section in the passage to thereby reduce flow related losses due to friction and turbulence. The nozzle passage and drive liquid passage may hereby form a continuous passage comprising several longitudinal portions of different conical shapes which gradually converge in the flow direction towards the nozzle opening.

According to a further embodiment of the invention the turbine is arranged with buckets for receiving the jet of pressurized liquid, the buckets being configured such that the liquid jet direction is reversed along a height of the bucket, wherein the bucket height is 2-3 times the diameter of the nozzle opening. The bucket height should not be less than 2 times the diameter of the liquid jet, since that would result in a collision between the incoming and reversed part of the jet. Such a collision would reduce the efficiency of the turbine significantly. However, a bucket height of more than 3 times the nozzle diameter will also reduce the efficiency of the turbine, since the high speed rotation of the centrifugal rotor will not give the jet enough time to travel the bucket height and be reversed effectively. The turbine and centrifugal rotor may rotate at a speed ranging from 6000 to 14000 rpm. The turbine would hereby rotate and turn away too much before the liquid jet has been sufficiently reversed. The impulse from the liquid jet is therefore ineffectively transferred to the turbine. The embodiment also provides a relatively small-sized turbine and thereby a drive chamber of reduced size, which is an important aspect in designing a compact apparatus to be mounted in a very limited space.

Within the above mentioned interval of 2 to 3 times the diameter of the nozzle, the height of the bucket may with advantage be in the range of 2-2.5 times the diameter of the nozzle opening, and in particular said height may with advantage be 2.3 times the diameter of the nozzle opening. The turbine may either have a horizontal or vertical rotational axis. Hence, the term "height" of the bucket does not imply a vertical orientation of these components. Instead, the turbine and centrifugal rotor may as well be arranged to rotate around a horizontal rotational axis. If the turbine is considered to have a cylindrical shape—the "height" is in the lengthwise direction of the cylinder.

According to another embodiment of the invention the turbine is configured with radius such that a ratio between the liquid jet speed and the tangential speed of the turbine, at the radius where the liquid jet is arranged to hit the bucket, is 2-3 during operation of the centrifugal rotor. The jet speed will depend on the nozzle and the pressure range on the liquid, wherein the centrifugal rotor speed is designed for a desired separating efficiency within a predicted load range (i.e. the amount of crankcase gas generated per unit time). In other words, the turbine radius is dimensioned in view of the operating conditions, such that the bucket speed is $\frac{1}{3}$ to $\frac{1}{2}$ of the liquid jet speed. The efficiency of the turbine will hereby peak at an optimum bucket speed of somewhat less than half the jet speed. The turbine does not however have to be run exactly at its optimum speed. Moving away ±15% from the optimum speed only reduces the efficiency by a few percent. Moving further away from this optimum speed range may however lead to a rapid decrease in turbine efficiency. The turbine may with advantage be configured such that the ratio is 2.2-2.6 between the jet speed and the bucket speed, and in particular it may be configured such that said ratio is 2.4. Hence, optimum turbine efficiency is obtained when the jet speed is 2.4 times the bucket speed of the turbine.

According to another embodiment of the invention the nozzle opening is arranged at a distance of 0.5-5 mm from the turbine. As the fluid jet exits the nozzle, the diameter of the jet expands in a conical manner to become less focused or concentrated with the distance from the nozzle opening. The nozzle opening is hereby arranged as close as possible to the bucket. In this way, the impulse from the liquid jet acts on the bucket more effectively as the jet is relatively focused in the vicinity of the nozzle opening. The closer they are together the more the diameter of the jet resembles the diameter of the nozzle opening. However, manufacturing tolerances limits this distance to 0.5 mm, since a shorter distance would risk damage to the drive arrangement due to the nozzle and the turbine coming into contact with each other during operation.

According to another embodiment the buckets of the turbine are configured with an inner curved part for reversing the jet along the height of the bucket, which inner curved part transitions into outer straight parts diverging in a radial outward direction. The straight outwardly diverging parts of the bucket are configured to funnel the jet into and out of the curved part of the bucket. Hence, if the jet enters an upper half of the bucket, the upper straight part guides the jet into the curved part and the lower straight part guides the jet out of the bucket.

The liquid pressure source may be a pump arranged to be driven by the combustion engine, such as an oil or water pump which is drivingly connected to the combustion engine. The liquid for driving the turbine may accordingly be oil or water which is pressurized by the oil or water pump respectively. The pump speed will hereby depend on the engine speed in such a manner that higher engine speeds give higher liquid pressures from the pump, and vice versa. Hence, the liquid pressure will follow the engine speed from a low pressure at engine idle speed to a maximum pressure of for instance 2-5 bars at higher engine speeds.

According to another embodiment of the invention the adapter element is configured to form a drive chamber casing and is releasably connected to a housing for the separation chamber, wherein a partition is arranged between the housing and the adapter element in such a manner that the drive chamber is delimited by the partition and the drive chamber casing, the drive shaft of the centrifugal rotor extending through the partition between the separation chamber and the drive chamber. The adapter element may in this way be cast in a single piece of aluminum to form a drive chamber casing having the drive liquid passage and nozzle integrated with an adapter element.

BRIEF DESCRIPTION OF THE DRAWINGS

The invention will be further explained by a description of an embodiment in the following with reference to the accompanying drawings, in which.

DETAILED DESCRIPTION OF AN EMBODIMENT OF THE INVENTION

Figure 1:
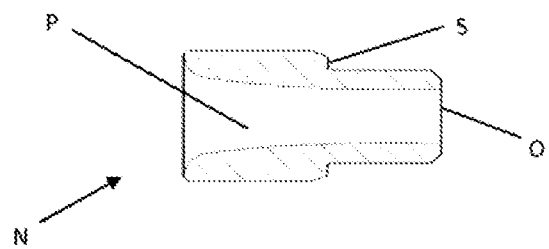
FIG. 1 shows a longitudinal section of a previously known nozzle.

FIG. 1 shows a longitudinal section of a known nozzle N (in isolation), which is intended to be used in the apparatus of U.S. Pat. No. 6,925,993 B1 described above. As can be seen the nozzle N comprises a trumpet-shaped (or curved profile) nozzle passage P, which converges in the flow direction towards a nozzle opening O. The nozzle N is machined from a piece of brass to a form comprising the trumpet-shaped nozzle passage and a nozzle body having an outside shoulder S to support the nozzle inside a drive oil passage in an adapter element of the apparatus (not shown). The machined nozzle is inserted into a drive oil passage of the adapter element for the supply of pressurized oil to drive a turbine and a centrifugal rotor for the cleaning of crankcase gas produced by a combustion engine in operation.

Figure 2:
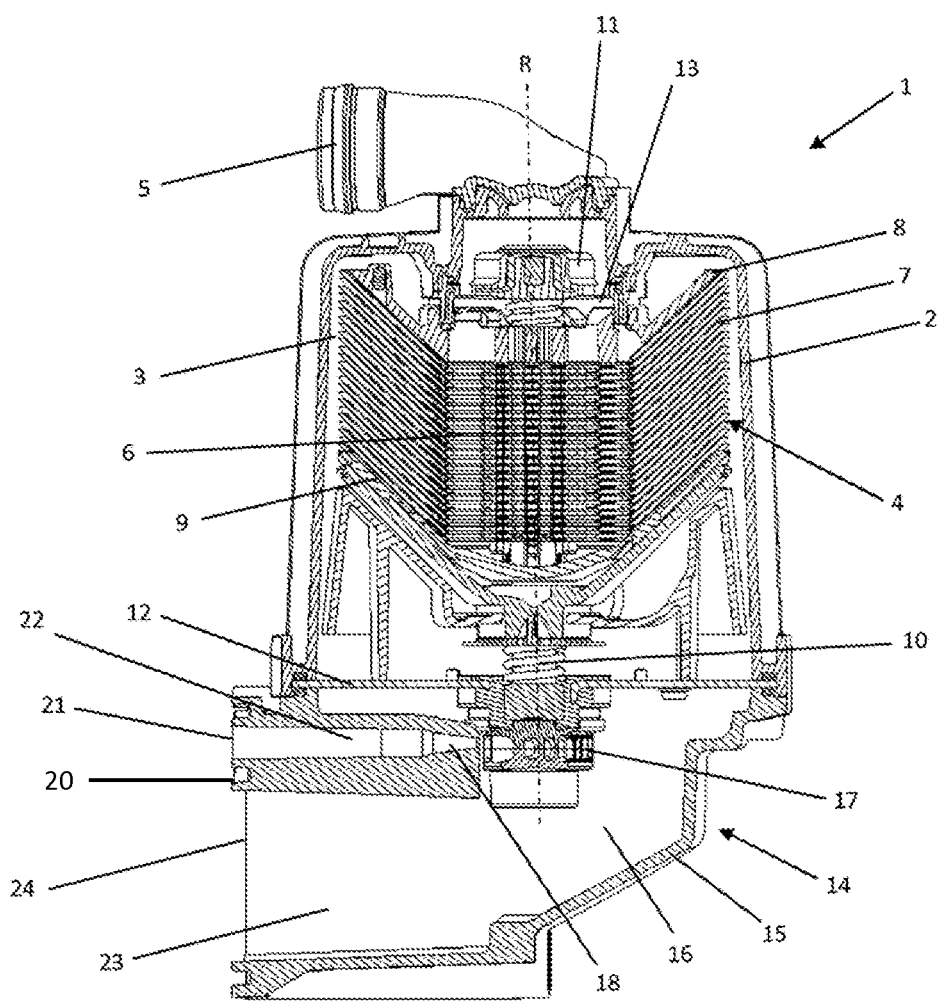
FIG. 2 shows a longitudinal section of an embodiment of the nozzle.

FIG. 2 shows an apparatus 1, according to an embodiment of the invention, for the cleaning of crankcase gas from an internal combustion engine. The apparatus 1 has a stationary housing 2 which delimits a separation chamber 3 for the crankcase gas, wherein a centrifugal rotor 4 is arranged to rotate about a vertical rotational axis R for the cleaning of crankcase gas in the separation chamber 3. The housing 2 has a gas inlet 5 which is configured to conduct the contaminated crankcase gas into a central inlet chamber 6 in the centrifugal rotor 4. The centrifugal rotor 4 includes of stack of frusto-conical separation discs 7 arranged on top of each other and axially between an upper end disc 8 and a lower end disc 9. Between the separation discs 7 there are distance members of a conventional kind for the formation of interspaces between adjacent separation discs for through-flow of the gas to be cleaned from the central inlet chamber 6 and radially outwardly.

The stack of separation discs 7 is supported by a central drive shaft 10. The drive shaft 10 is journalled at its upper end by a ball bearing (not shown) in an upper cap 11. At its lower end the drive shaft 10 is journalled by means of a ball bearing (not shown) in a partition 12 which forms a bottom of the separation chamber 3. Each separation disc has a central plane portion having a hole for the drive shaft 10 and several further holes distributed around the drive shaft 10. The further holes in the separation discs 7 and the interspaces between the central plane portions of the separation discs form together the central inlet chamber 6 in the centrifugal rotor 4, which communicates through holes 13 in the cap 11 with the gas inlet 5 for gas to be cleaned and also communicates through the interspaces between the separation discs 7 with the part of the separation chamber 3 surrounding the centrifugal rotor 4. This part of the separation chamber 3 communicates in turn with a gas outlet (not shown) for the crankcase gas having been cleaned.

The housing 2 rests on and is releasably connected to an adapter element 14 by means of screws (not shown). The adapter element 14 forms a drive chamber casing 15 surrounding a drive chamber 16 for the centrifugal rotor 4.

The drive chamber casing 15 of the adapter element 14 and the aforementioned partition 12 delimit the drive chamber 16, wherein the drive shaft 10 of the centrifugal rotor 4 extends through the partition 12 and into the drive chamber 16. Inside the drive chamber 16 there is a turbine 17 which is connected to the drive shaft 10 of the centrifugal rotor 4. A nozzle 18 is formed in the adapter element 14 which is arranged to receive pressurized liquid form the combustion engine and to direct the pressurized liquid in a jet from a nozzle opening 19. The nozzle opening 19 is arranged at a very close distance (e.g. 0.5-5 mm) from the turbine 17 which is arranged with buckets for receiving the jet of pressurized liquid to drive the centrifugal rotor 4.

The adapter element 14 is supported by and is releasably connected with the combustion engine by means of screws (not shown). The adapter element 14 has an abutment surface 20 having a relatively small drive liquid opening 21 in communication with a drive liquid passage 22 formed in the adapter element 14. The drive liquid opening 21 is arranged to receive the pressurized liquid from a supply opening (not shown) in a corresponding abutment surface of the combustion engine. The nozzle 18 and the drive liquid passage 22 form a continuous passage to direct the jet of pressurized liquid against the turbine 17. An outlet channel 23 extends away from the drive chamber 16 and is intended for leading away liquid having been used for driving of the turbine 17 and the centrifugal rotor 4. The abutment surface 20 of the adapter element 14 has a relatively large opening 24 in communication with the outlet channel 23. The corresponding abutment surface of combustion engine is provided with a corresponding opening intended to be placed opposite the relatively large opening 24 for receiving the liquid having been used for driving the centrifugal rotor 4.

Figure 3:
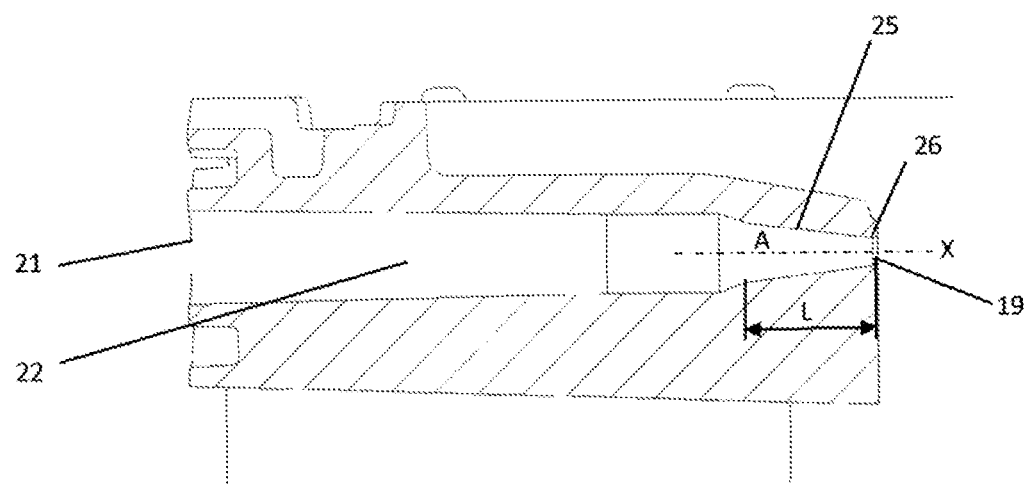
FIG. 3 shows a longitudinal section of an adapter element according to the embodiment of the invention.

FIG. 3 shows the adapter element 14 of the embodiment with the integrally formed nozzle 18. The nozzle 18 formed in the adapter element 14 comprises a nozzle passage having a conical shape 25 which converges in the flow direction towards the nozzle opening 19. As can be seen the conical shape 25 converges essentially along the entire length L of the nozzle passage up to the nozzle opening 19. The nozzle passage is also formed with a small longitudinal portion (e.g. of 0.1-1 mm) of cylindrical shape 26 at the nozzle opening 19. The conical shape 25 of the nozzle passage converges to form an angle A of 7° to a center line X of the nozzle passage. The nozzle passage and drive liquid passage 22 forms a continuous passage comprising several longitudinal portions of different conical shapes which gradually converge in the flow direction towards the nozzle opening 19.

Figure 4:
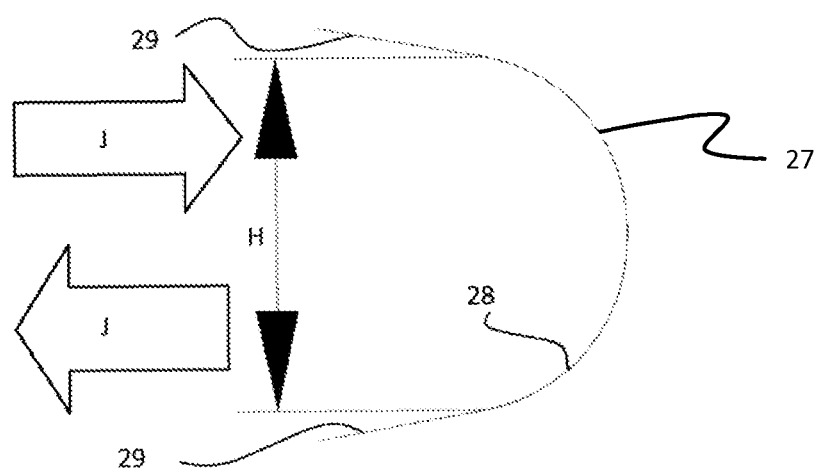
FIG. 4 shows a longitudinal section along a bucket of a turbine according to an embodiment of the invention.

FIG. 4 shows a longitudinal section along a bucket height H of the turbine 17. The liquid jet J is represented by large arrows. The bucket 27 is configured with a curved part 28 which transitions into upper and lower straight parts 29 which are outwardly diverging. The straight outwardly diverging parts 29 of the bucket 27 are configured to funnel the jet J into and out of the curved part 28 of the bucket 27. Hence, as the liquid jet J enters the upper half of the bucket, the upper straight part 29 guides the liquid jet J into the curved part 28 and the lower straight part 29 guides the liquid jet J out of the bucket 27. The curved part 28 of the bucket 27 is where the liquid jet J is reversed to provide the impulse on the turbine 17. Therefore, as shown in FIG. 4, the height H of the bucket 27 is in fact measured as the height of the curved part 28 only. In practice however the height H may as well be measured at the opening of the bucket 27 to thereby include both the curved part 28 and the straight parts 29, since this height is practically the same as the height H of the curved part 28. The height H of the buckets 27 is 2-3 times the diameter of the nozzle opening 19. As shown in FIG. 2, the nozzle opening 19 is disposed such as to direct the liquid jet into an upper half of the bucket 27. Hence, the liquid jet J is received in the upper half of the bucket 27, inside which the liquid jet is reversed to exit a lower half of the bucket 27. The diameter of the nozzle opening 19 may for instance range from 2.1 mm to 2.9 mm, wherein the buckets 27 have approximately the same width as the diameter of the nozzle opening 19. Consequently, the turbine 17 is of relatively small size.

The nozzle opening 19 is directed against the bucket 27 in the tangential direction of the turbine 17. The liquid jet J is ejected at a velocity V1 from the nozzle opening 19. The liquid pressure source may be a pump arranged to be driven by the combustion engine, such as an oil or water pump which is drivingly connected to the combustion engine. The liquid for driving the turbine may accordingly be oil or water which is pressurized by the oil or water pump respectively. In this embodiment the liquid is pressurized lubricating oil from the combustion engine. The speed V1 of the oil jet may vary somewhat with the engine speed, since the oil pump is connected to the engine in such a way that oil pressure will vary with engine speed. An increased oil pressure will accordingly increase the oil jet speed V1, whereby the turbine 17 and centrifugal rotor 4 will rotate faster. The turbine 17 has a tangential speed V2 at a radius R where the jet hits the bucket 27. The turbine 17 is dimensioned with the radius R such that a ratio V1/V2 between the oil jet speed V1 and the tangential speed V2 is 2-3 during operation of the centrifugal separator.

Hence, the jet speed V1 is at least 2 times but not more than 3 times the bucket speed V2 of the turbine 17. Within this range the efficiency of the turbine peaks. During normal operation of the combustion engine of a heavy-duty truck the jet speed V1 will typically range from 20 m/s to 30 m/s from the nozzle opening 19 against the buckets 27 of turbine 17, so that this is caused to rotate about the rotational axis R. The optimum bucket speed V2 will lie within ½ to ⅓ of the oil jet speed V1. If the centrifugal rotor is desired to rotate at 6000 to 14000 rpm for the cleaning crankcase gas flow rates of 40 to 800 liters per minute the turbine 17 will typically be dimensioned with a radius R of approximately 10 mm to 15 mm.

The apparatus shown in the drawing operates in the following in connection with cleaning of crankcase gas coming from the internal combustion engine, the crankcase of which (not shown) is connected to the gas inlet 5 of the apparatus at the upper part of the housing 2.

Lubricating oil is directed at high pressure through drive liquid passage 22 and the conical nozzle passage 25 formed in the adapter element 14. Lubricating oil is discharged from the nozzle opening 19 against the buckets 27 of turbine 17. The liquid jet J is received in the upper half of the bucket 27, inside which the liquid jet J is reversed to exit a lower half of the bucket 27, so that the turbine 17 is caused to rotate about the rotational axis R. Upon the resulting rotation of the centrifugal rotor 4 the crankcase gas therein is caused to rotate, whereby the gas is pumped outwardly through the interspaces between the separation discs 7. A partial vacuum will come up in the central inlet chamber 6 of the centrifugal rotor 4, so that crankcase gas is sucked in to the centrifugal rotor 4. The crankcase gas is forced to flow through the centrifugal rotor 4 under rotation, whereby the contaminants are separated by centrifugal force as the crankcase gas flows through the interspaces in the stack of separation discs 7. The centrifugal forces acting on the rotating gas will cause the contaminants in the form of oil and soot particles to deposit on the surfaces of the separation discs 7. Separated contaminants will thereafter be thrown from the separation discs 7 onto the inside wall of the stationary housing 2. The contaminants may then flow down along the inner wall to the partition 12 at the bottom of the separation chamber 3, wherein the partition 12 is configured with a drain outlet for conducting the contaminants into the drive chamber 16. The separated oil and the pressurized oil for driving the centrifugal rotor 4 runs back to the crankcase of the combustion engine via the relatively large opening 24 in communication with the outlet channel 23 of the drive chamber 16. The cleaned crankcase gas in the separation chamber is conducted via a gas outlet (not shown) which is communicating with an air intake of the combustion engine.

The invention claimed is:

1. An apparatus for cleaning of crankcase gas from a combustion engine, the apparatus comprising:
    a centrifugal rotor, said centrifugal rotor being arranged to rotate about a rotational axis and adapted for the cleaning of the crankcase gas in a separation chamber, the centrifugal rotor comprising a drive shaft extending into a drive chamber of the apparatus;
    a turbine connected to the drive shaft;
    a nozzle arranged to receive pressurized liquid from the combustion engine and to direct the pressurized liquid in a jet from a nozzle opening thereof against the turbine for rotation of the centrifugal rotor; and
    an adapter element for mounting the apparatus onto the combustion engine, the adapter element comprising:

an abutment surface arranged to abut against a corresponding abutment surface on the combustion engine, the abutment surface of the adapter element having a drive liquid opening arranged to receive the pressurized liquid from a supply opening in the abutment surface of the combustion engine; and a drive liquid passage connecting the drive liquid opening with the nozzle, wherein the nozzle is integrally formed with the adapter element with a nozzle passage having a conical shape which converges in a flow direction towards the nozzle opening, and wherein the conical shape of the nozzle passage converges to form an angle in a range of 5°-9° to a center line of the nozzle passage, wherein the turbine is arranged with buckets for receiving the jet of pressurized liquid, the buckets being configured such that a liquid jet direction is reversed along a height of the bucket, and wherein the height of the bucket is 2-2.5 times a diameter of the nozzle opening.

2. The apparatus according to claim 1, wherein the conical shape of the nozzle passage converges to form an angle of 7° to the center line of the nozzle passage.

3. The apparatus according to claim 1, wherein the buckets are configured with an inner curved part for reversing the liquid along the height of the bucket, which inner curved part transitions into outer straight parts diverging in a direction radially outwardly.

4. The apparatus according to claim 1, wherein the bucket height is 2-2.5 times the diameter of the nozzle opening.

5. The apparatus according to claim 1, wherein the bucket height is 2.3 times the diameter of the nozzle opening.

6. The apparatus according to claim 1, wherein the drive liquid passage is configured with a longitudinal portion having a conical shape for converging pressurized liquid into the conical nozzle passage.

7. The apparatus according to claim 6, wherein the nozzle passage and drive liquid passage form a continuous passage comprising several longitudinal portions of different conical shapes which gradually converge in the flow direction towards the nozzle opening.

8. The apparatus according to claim 1, wherein the turbine is configured with a radius such that a ratio (V1/V2) between a fluid jet speed (V1) and a tangential speed (V2) of the turbine at the radius where the fluid jet is arranged to hit the bucket is 2-3 during operation of the centrifugal rotor.

9. The apparatus according to claim 8, wherein said ratio (V1/V2) is 2.2-2.6.

10. The apparatus according to claim 8, wherein said ratio (V1/V2) is 2.4.

11. The apparatus according to claim 1, wherein the conical shape of the nozzle passage converges at least along a major longitudinal portion of the nozzle passage.

12. The apparatus according to claim 11, wherein the conical shape of the nozzle passage converges along an entire length of the nozzle passage up to the nozzle opening.

13. The apparatus according to claim 11, wherein the nozzle passage comprises a minor longitudinal portion having a cylindrical shape at the nozzle opening, wherein the minor longitudinal portion is several times shorter than the major longitudinal portion having the conical shape.

14. The apparatus according to claim 13, wherein the minor longitudinal portion having the cylindrical shape at the nozzle opening constitutes 0.1-1 mm of the nozzle passage.

15. An apparatus for cleaning of crankcase gas from a combustion engine, the apparatus comprising:

a centrifugal rotor, said centrifugal rotor being arranged to rotate about a rotational axis and adapted for the cleaning of the crankcase gas in a separation chamber, the centrifugal rotor comprising a drive shaft extending into a drive chamber of the apparatus;

a turbine connected to the drive shaft;

a nozzle arranged to receive pressurized liquid from the combustion engine and to direct the pressurized liquid in a jet from a nozzle opening thereof against the turbine for rotation of the centrifugal rotor; and an adapter element for mounting the apparatus onto the combustion engine, the adapter element comprising:

an abutment surface arranged to abut against a corresponding abutment surface on the combustion engine, the abutment surface of the adapter element having a drive liquid opening arranged to receive the pressurized liquid from a supply opening in the abutment surface of the combustion engine; and a drive liquid passage connecting the drive liquid opening with the nozzle, wherein the nozzle is integrally formed with the adapter element with a nozzle passage having a conical shape which converges in a flow direction towards the nozzle opening, wherein the nozzle opening is arranged at a distance of 0.5-5 mm from the turbine, and wherein the conical shape of the nozzle passage converges to form an angle in the range of 5°-9° to a center line of the nozzle passage, wherein the turbine is arranged with buckets for receiving the jet of pressurized liquid, the buckets being configured such that the liquid jet direction is reversed along a height of the bucket, and wherein the height of the bucket is 2-2.5 times the diameter of the nozzle opening.

16. An apparatus for cleaning of crankcase gas from a combustion engine, the apparatus comprising:

a centrifugal rotor, said centrifugal rotor being arranged to rotate about a rotational axis and adapted for the cleaning of the crankcase gas in a separation chamber, the centrifugal rotor comprising a drive shaft extending into a drive chamber of the apparatus;

a turbine connected to the drive shaft;

a nozzle arranged to receive pressurized liquid from the combustion engine and to direct the pressurized liquid in a jet from a nozzle opening thereof against the turbine for rotation of the centrifugal rotor; and an adapter element for mounting the apparatus onto the combustion engine, the adapter element comprising:

an abutment surface arranged to abut against a corresponding abutment surface on the combustion engine, the abutment surface of the adapter element having a drive liquid opening arranged to receive the pressurized liquid from a supply opening in the abutment surface of the combustion engine; and a drive liquid passage connecting the drive liquid opening with the nozzle, wherein the nozzle is integrally formed with the adapter element with a nozzle passage having a conical shape which converges in the flow direction towards the nozzle opening, and wherein the nozzle opening is arranged at a distance of 0.5-5 mm from the turbine, wherein the adapter element is configured to form a drive chamber casing and is releasably connected to a housing for the separation chamber, wherein a partition is arranged between the housing and the adapter element in such a manner that the drive chamber is delimited by the partition and the drive chamber casing, the drive shaft of the centrifugal rotor extending through the partition between the separation chamber and the drive chamber, and wherein the conical shape of the nozzle passage converges to form an angle in the range of 5°-9° to a center line of the nozzle passage, wherein the turbine is arranged with buckets for receiving the jet of pressurized liquid, the buckets being configured such that the liquid jet direction is reversed along a height of the bucket, and wherein the height of the bucket is 2-2.5 times the diameter of the nozzle opening.

\* \* \* \* \*